(12) United States Patent
Roy et al.

(10) Patent No.: US 9,123,019 B1
(45) Date of Patent: Sep. 1, 2015

(54) METHOD, WEB BROWSER AND SYSTEM FOR CO-BROWSING ONLINE CONTENT

(75) Inventors: Ashutosh Roy, Los Altos, CA (US); Promod Narang, Los Altos, CA (US)

(73) Assignee: EGAIN COMMUNICATIONS CORPORATION, Mountain View, CA (US)

( * ) Notice: Subject to any disclaimer, the term of this patent is extended or adjusted under 35 U.S.C. 154(b) by 1043 days.

(21) Appl. No.: 12/210,463

(22) Filed: Sep. 15, 2008

Related U.S. Application Data (60) Provisional application No. 61/039,370, filed on Mar. 25, 2008.

(51) Int. Cl.
*G06F 15/16* (2006.01)
*G06Q 10/10* (2012.01)

(52) U.S. Cl.
CPC ...................................... *G06Q 10/10* (2013.01)

(58) Field of Classification Search
USPC .......................................................... 709/205
See application file for complete search history.

(56) References Cited

U.S. PATENT DOCUMENTS

| | | | |
|---|---|---|---|
| 6,295,551 B1 * | 9/2001 | Roberts et al. | 709/205 |
| 2003/0097448 A1 * | 5/2003 | Menezes et al. | 709/227 |
| 2005/0240558 A1 * | 10/2005 | Gil et al. | 707/1 |

* cited by examiner

*Primary Examiner* — Jerry Dennison (57) ABSTRACT

A method, web browser, and system for co-browsing online content is disclosed. Embodiments enable a co-browsing session between web browsers running on different computer systems using a respective peer proxy server on each computer system. A primary peer proxy server running on a first computer system communicates directly with a web server, while communications from other peer proxy servers running on other computer systems are directed through the primary peer proxy server. The primary peer proxy server accesses online content from the web server for presentation using a web browser running on the first computer system, where the online content is presented simultaneously with modified online content presented using web browsers running on the other computer systems. The online content and the modified online content may be synchronized based upon a web server response associated with a browser event communicated to the web server.

30 Claims, 9 Drawing Sheets

METHOD, WEB BROWSER AND SYSTEM FOR CO-BROWSING ONLINE CONTENT

RELATED APPLICATIONS

The present application claims the benefit of U.S. Provisional Patent Application No. 61/039,370, filed Mar. 25, 2008, entitled "PEER TO PEER CENTRIC N-WAY BROWSING (CO-BROWSER)," naming Ashutosh Roy and Promod Narang as inventors. That application is incorporated herein by reference in its entirety and for all purposes.

BACKGROUND OF THE INVENTION

Web sites are often complex and burdensome to navigate. For example, a web site may include many web pages, making it difficult for users to find desired information. Additionally, the content of a given web page may be difficult for a user to understand. For example, a user may not understand how to fill out a portion of a form on a web page, thereby preventing the user from moving on to subsequent portions of the form.

One conventional solution to these problems involves enabling users to chat with customer service representatives. Although users may ask questions via the chat service, customer service representatives are unable to see the web pages as viewed by the user. Accordingly, the customer service representatives can only offer generalized assistance in response to the user's questions. Further, such chat sessions are often lengthy, thereby timing out the browser session and forcing the user to re-enter information.

Another conventional solution involves using a remote desktop-sharing program such as that offered with Windows XP from MICROSOFT® Corporation. However, such programs often require the user to download large pieces of code. Additionally, most remote desktop-sharing programs provide exclusive access to only one user at a time. Therefore, such programs are not suited for offering remote assistance to users of web pages and performing other operations where simultaneous viewing of a web page would be beneficial.

Other conventional solutions utilize a server-side proxy-based approach for enabling two web browsers to simultaneously browse a web page. Such conventional solutions often require server-side configuration specific to the web pages being co-browsed. This web site-specific configuration and customization effort makes such conventional solutions relatively expensive. Thus, conventional server-side proxy-based approaches are not widely adopted for co-browsing web content.

SUMMARY OF THE INVENTION

Accordingly, a need exists for a convenient and efficient mechanism for enabling users to co-browse a web page preferably without downloading large pieces of code and/or instructions. Additionally, a need exists for such a co-browsing solution which is independent of the web content being co-browsed, and therefore, may be used to co-browse web pages without a proxy-based server-side co-browsing solution. What is also needed is a web co-browsing mechanism that is transparent to the web source such that the web sever delivering the content does not have to be changed to enable co-browsing of the content delivered by it. Embodiments of the present invention provide novel solutions to these needs and others as described below.

Embodiments of the present invention are directed to a method, web browser, and system for co-browsing online content. More specifically, embodiments enable a co-browsing session between web browsers running on different computer systems using a respective peer proxy server on each computer system. A primary peer proxy server running on a first computer system communicates directly with a web server, while communications from other peer proxy servers running on other computer systems are directed through the primary peer proxy server. The primary peer proxy server accesses online content from the web server for presentation using a web browser running on the first computer system, where the online content is presented simultaneously with modified online content (e.g., generated based upon the online content and for directing browser events from the other computer systems to the primary peer proxy server) presented using web browsers running on the other computer systems. Additionally, the online content and the modified online content may be synchronized based upon a web server response (e.g., from the web server) associated with a browser event communicated to the web server directly from the primary peer proxy server and/or indirectly from a peer proxy server running on one of the other computer systems. In this manner, users of the web browsers running on the first computer system and the other computer systems may co-browse (e.g., view, interact with, modify, etc.) the online content.

The web server and the web browsers may be unaware of the collaboration of the peer proxy servers, where each of the peer proxy servers may run within a respective web browser (e.g., as a plug-in, etc.) or within a separate process in communication with the respective web browser. Additionally, the other computer systems may be coupled in a daisy-chain arrangement where peer proxy requests (e.g., generated in response to browser events) are communicated to the primary peer proxy server via at least one other peer proxy server running on the other computer systems. Peer proxy responses generated based upon the web server response may also be communicated to a given peer proxy server via the at least one other peer proxy server, thereby enabling synchronization of the online content (e.g., presented using the web browser running on the first computer system) with the modified online content (e.g., presented using web browsers running on the other computer systems coupled in the daisy-chain arrangement). Alternatively, the other computer systems may be coupled in a hub-and-spoke arrangement where peer proxy requests (e.g., generated in response to browser events) are communicated directly to the primary peer proxy server by each of the other peer proxy servers running on the other computer systems. Peer proxy responses generated based upon the web server response may also be communicated directly to a given peer proxy server from the primary peer proxy server, thereby enabling synchronization of the online content (e.g., presented using the web browser running on the first computer system) with the modified online content (e.g., presented using web browsers running on the other computer systems coupled in the hub-and-spoke arrangement).

In one embodiment, a method of co-browsing online content between a first computer system and a second computer system includes activating a first peer proxy server on the first computer system and a second peer proxy server on the second computer system, wherein the first computer system is disposed remotely from the second computer system. Modified online content is generated for presentation by the second web browser during presentation of the online content by the first web browser, wherein the modified online content is further for routing browser events associated with the second web browser through the first peer proxy server. A browser event initiated from the second web browser is communicated to a web server via the first peer proxy server. The method also includes synchronizing the first and second web browsers based on a web server response from the web server generated in response to the browser event, wherein the synchronizing further includes updating the online content and the modified online content based upon the web server response.

In another embodiment, a web browser for co-browsing online content includes a first peer proxy server of a first computer system operable to establish a co-browsing session with a second web browser running on a second remote computer system. The first peer proxy server is further operable to access the online content from a web server and based thereon generate modified online content for presentation by the second web browser during presentation of the online content by the web browser, wherein the modified online content is further for routing browser events associated with the second web browser through the first peer proxy server. The first peer proxy server is further operable to communicate a browser event initiated from the second web browser to the web server. The first peer proxy server is further operable to generate a peer proxy response based upon a web server response from the web server, the peer proxy response for communication to a second peer proxy server of the second web browser and further for synchronizing the modified online content with the online content based upon the web server response.

In yet another embodiment, a system for co-browsing online content includes a web server and a first computer system coupled to the web server, wherein the first computer system includes a first web browser and a first peer proxy server, wherein the first web browser is operable to present the online content accessed from the web server. The system also includes a second computer system coupled to the first computer system, wherein the second computer system includes a second web browser and a second peer proxy server, and wherein the second computer system is disposed remotely from the first computer system. The first peer proxy server is operable to generate modified online content based upon the online content, wherein the first peer proxy server is further operable to communicate the modified online to the second web browser for presentation using the second web browser during presentation of the online content by the first web browser, wherein the modified online content is further for routing browser events associated with the second web browser through the first peer proxy server, wherein the first peer proxy server is further operable to communicate a browser event initiated from the second web browser to the web server, wherein the first peer proxy server is further operable to generate a peer proxy response based upon a web server response from the web server, and wherein the first peer proxy server is further operable to communicate the peer proxy response to the second peer proxy server for synchronizing the modified online content with the online content based upon the web server response.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

NOTATION AND NOMENCLATURE

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "creating," "debugging," "defining," "delivering," "depicting," "detecting," "determining," "displaying," "establishing," "executing," "flipping," "generating," "grouping," "hiding," "identifying," "initiating," "interacting," "modifying," "monitoring," "moving," "outputting," "performing," "placing," "presenting," "processing," "programming," "querying," "removing," "repeating," "resuming," "sampling," "simulating," "sorting," "storing," "subtracting," "suspending," "tracking," "transcoding," "transferring," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

Figure 1:
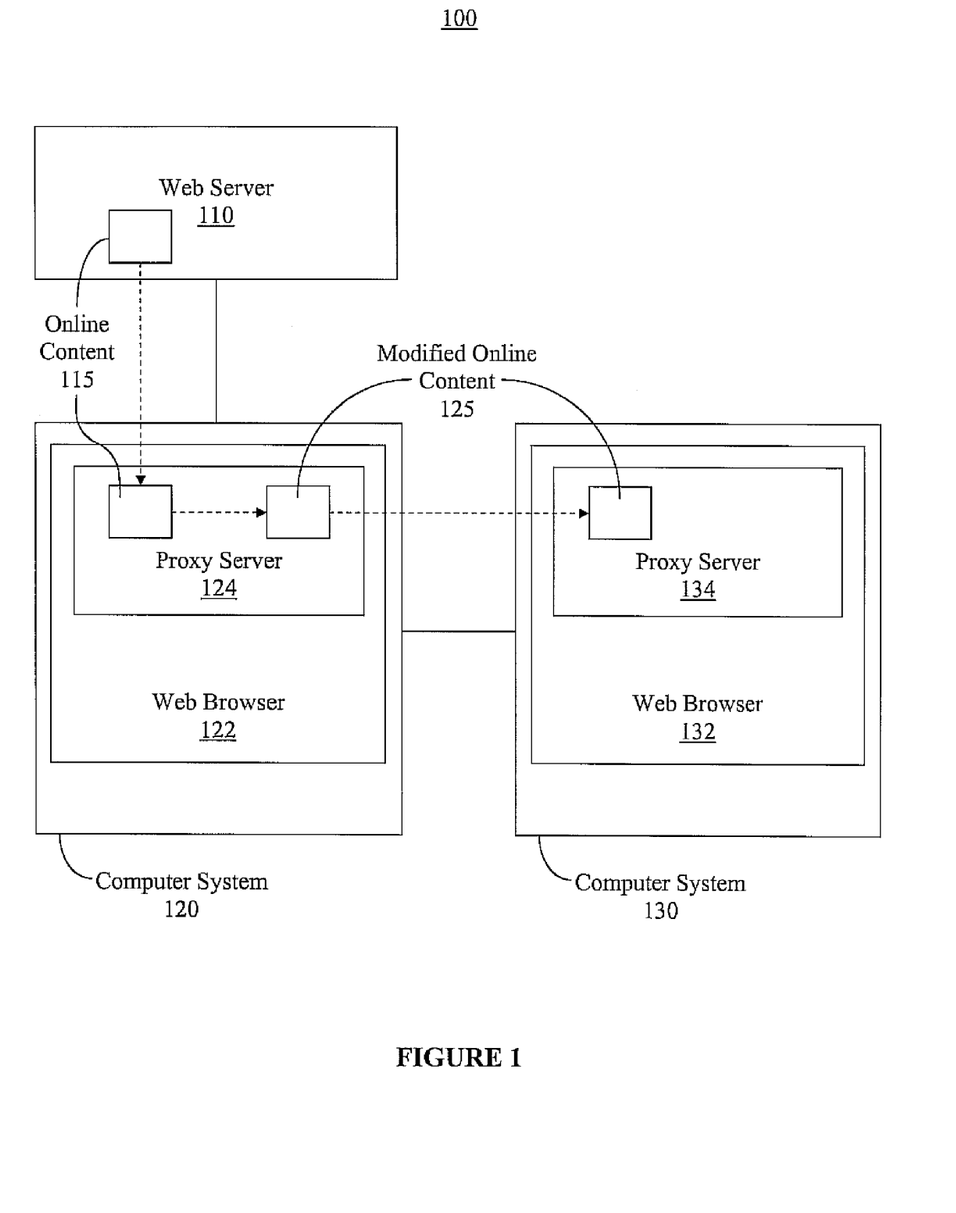
FIG. 1 shows an exemplary system for two or more computer systems co-browsing online content in accordance with one embodiment of the present invention.

FIG. 1 shows exemplary system 100 for two or more computer systems co-browsing online content in accordance with one embodiment of the present invention. As shown in FIG. 1, a co-browsing session may be established between web browser 122 running on computer system 120 and web browser 132 running computer system 130, where each of computer systems 120 and 130 have a respective peer proxy server (e.g., 124 and 134, respectively). Peer proxy server 124 may be a primary peer proxy server, and thus, communicate directly with web server 110. For example, peer proxy server 124 may access online content 115 (e.g., including code, images, video, or other content related to a web page or otherwise accessed through the Internet) and generate modified online content 125 for access by web browser 132. Simultaneous access of online content 115 by computer system 120 and modified online content 125 by computer system 130 may enable simultaneous co-browsing of the online content by web browsers 122 and 132 in one embodiment. This co-browsing may be transparent to web server 110.

Modified online content 125 may direct all browser events or other communications related to online content 115 and/or modified online content 125 through peer proxy server 124 (e.g., by tagging or encoding modified online content 125 and/or other communications to indicate primary peer proxy server 124, as opposed to web server 110, as the origin of modified online content 125 and/or the other communications), thereby enabling users of both web browsers 122 and 132 to interact with (e.g., activate links, enter information into fields, play content, etc.) online content 115. Additionally, peer proxy server 124 may synchronize modified online content 125 with online content 115 (e.g., by sending a peer proxy response based upon a web server response received from web server 110 in response to a browser event generated by web browser 122 and/or 132), thereby enabling web browsers 122 and 132 to present respective content (e.g., 115 and 125) which is substantially similar in appearance. In this manner, a user of web browser 132 may co-browse online content 115 simultaneously with a user of web browser 122.

Co-browsing as used herein may refer to any interaction with online content (e.g., a web page or other content accessed through the internet) using a plurality of web browsers (e.g., 122, 132, etc.). The content displayed or presented using the web browsers (e.g., 122, 132, etc.) may have a similar or identical appearance in one embodiment. However, the underlying coding of modified online content 125 may be different from that of online content 115 (e.g., without substantially affecting the appearance of modified online content 125 since the coding is not readily visible to a user of the web browser), thereby enabling the modified coding of modified online content 125 to direct browser events (e.g., generated by web browser 132) to primary peer proxy server 124 for carrying out co-browsing operations in a way that is transparent to web server 110.

Figure 5:
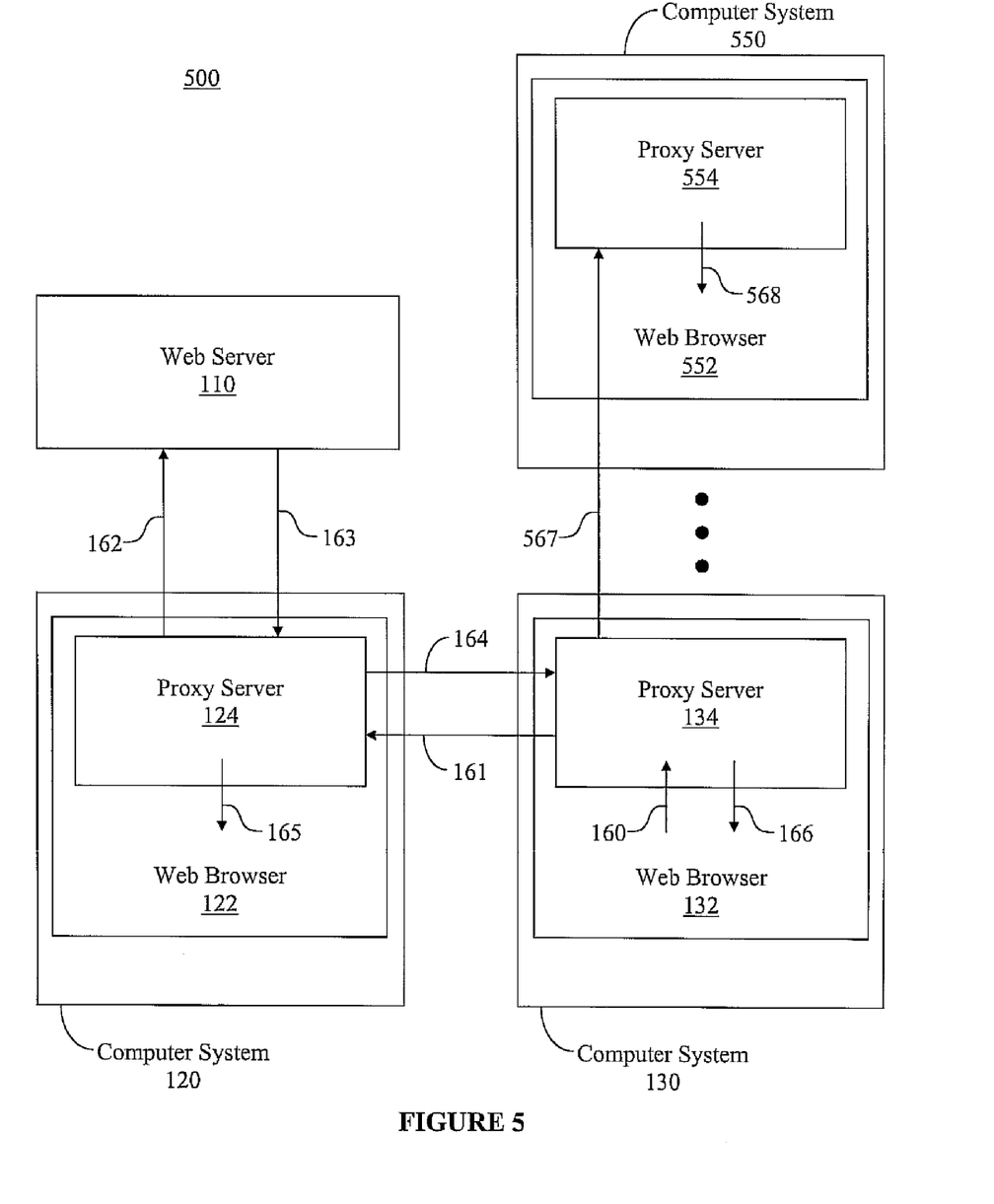
FIG. 5 shows an exemplary system for co-browsing online content with at least three computer systems coupled in a daisy-chain arrangement in accordance with one embodiment of the present invention.

Computer systems 120 and 130 may be disposed remotely from one another. For example, computer system 120 may be located in one room of a house, while computer system 130 is located in another room of the same house. Alternatively, computer systems 120 and 130 may be located more remotely from one another (e.g., in different states, in different countries, etc.). Accordingly, embodiments enable co-browsing sessions to be carried out over very long distances. Additionally, since peer proxy servers 124 and 134 are run locally on their respective computer systems (e.g., as a web browser plug-in, as a process separate from the web browser as shown in FIG. 5, etc.), embodiments enable co-browsing of online content without needing to download large pieces of code and without reliance on server-side co-browsing code in one embodiment.

Co-browsing using a plurality of web browsers (e.g., 122, 132, etc.) may be used to assist users (e.g., in filling out forms of a web page, navigating web pages, etc.) in one embodiment. Alternatively, presentations may be carried out using system 100, where the content (e.g., 115, 125, etc.) may include content of a presentation to be accessed and/or modified by remote parties. And in one embodiment, co-browsing using system 100 may be used to play games (e.g., where the content is that of a game). Alternatively, system 100 may be used in any other scenario where viewing and/or modifying substantially the same content may be beneficial.

In one embodiment, access restrictions may be set by one or more users participating in a co-browsing session. For example, a first user may limit a second user's ability to edit a form or field, thereby providing read-only access to other users. As another example, a user may limit the ability for other users to see or otherwise access certain types of information (e.g., social security numbers, credit card numbers, other confidential or secure information, etc.). As a further example, a user may limit the ability of other users to perform certain actions associated with the online content (e.g., click on a button or link to consummate a purchase, etc.).

Access restrictions set by users may be used to generate the modified online content (e.g., 125) from the online content (e.g., 115) in one embodiment. For example, where credit card information is to be restricted as indicated by a user-initiated access restriction, the modified online content (e.g., 125) may be generated such that information from the online content (e.g., 115) associated with credit card information is hidden or is otherwise inaccessible to a user viewing the modified online content (e.g., 125).

Figure 2:
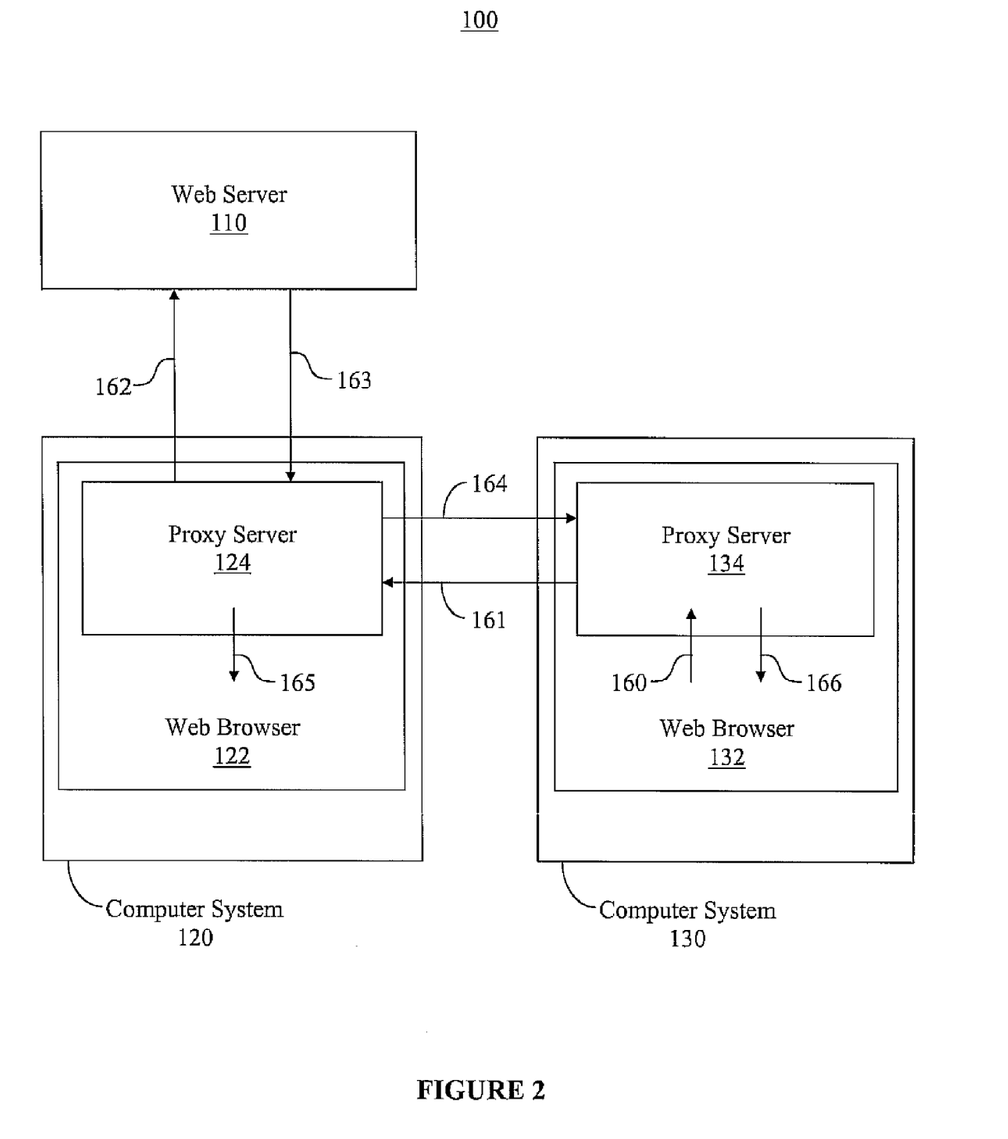
FIG. 2 shows an exemplary system for synchronizing online content in response to a browser event in accordance with one embodiment of the present invention.

FIG. 2 shows exemplary system 100 for synchronizing online content in response to a browser event in accordance with one embodiment of the present invention. As shown in FIG. 2, system 100 may synchronize online content (e.g., 115) and modified online content (e.g., 125) using respective browser commands (e.g., 165 and 166) generated in response to a browser event (e.g., 160). For example, browser command 165 may be communicated to web browser 122 (e.g., for updating online content 115 presented using web browser 122) and browser command 166 may be communicated to web browser 132 (e.g., for updating modified online content 125 presented using web browser 132), where the synchronization of the content may be in response to a browser event (e.g., 160, a browser event generated by web browser 122, etc.).

Browser event 162 may be generated by web browser 132 and communicated to peer proxy server 134. Browser event 162 may be any event generated in response to a user interaction with the web browser (e.g., 132). For example, browser event 162 may be generated in response to a user-submission of a form, entry of text into a user-modifiable field, a user selection of a link, etc. Although not shown in FIG. 2, it should be appreciated that synchronization of online content 115 and modified online content 125 during a co-browsing session may occur in response to a browser event communicated from web browser 122 to peer proxy server 124.

Peer proxy server request 161 may be generated in response to browser event 160 and communicated from peer proxy server 134 to peer proxy server 124. Generation and communication of the peer proxy response (e.g., 161) may occur based upon coding of modified online content 125 (e.g., including code modifications made to online content 115). Further, it should be appreciated that the generation and communication of peer proxy response 161 may be preformed using embodiments of the present invention in lieu of communicating a response directly to web server 110 in one embodiment.

Web server request 162 may be generated by peer proxy server 124 and communicated to web server 110. Web server request 162 may be generated based upon peer proxy server request 161 in one embodiment. Additionally, the web server request (e.g., 162) may indicate that the primary peer proxy server (e.g., 124) is the origin of the browser event (e.g., 160), thereby directing the web server (e.g., 110) to communicate web server responses (e.g., 163) to the primary peer proxy server (e.g., 124). Alternatively, web server request 162 may be generated in response to a browser event generated by web browser 122 (not shown in FIG. 2) and communicated to peer proxy server 124.

Web server response 163 may be generated by web server 110 and communicated to peer proxy server 124. Additionally, peer proxy response 164 may be generated by peer proxy server 124 and communicated to peer proxy server 134. Web server response 163 may be generated based upon web server request 162, and peer proxy response 164 may be generated based upon web server response 163.

Web server response 163 may indicate how online content 115 can be updated (e.g., using browser command 165) in response to the browser event (e.g., 160), while peer proxy response 164 may indicate how modified online content 125 can be updated (e.g., using browser command 166) in response to the browser event (e.g., 160). For example, if the browser event (e.g., 160) was generated in response to a submission of a form, web server response 163 and/or peer proxy response 164 may include data for displaying a different web page (e.g., on web browsers 122 and 132) informing a user that the form has been successfully submitted (e.g., thereby synchronizing online content 115 with modified online content 125 using browser commands 165 and 166). Alternatively, if the browser event (e.g., 160) was generated in response to text entered by a user in a user-modifiable field (e.g., of modified online content 125 presented using web browser 132), web server response 163 and/or peer proxy response 164 may include data for updating online content 115 to present the text on web browser 122 (e.g., thereby synchronizing online content 115 with modified online content 125 using browser command 165).

As shown in FIG. 2, the co-browsing session between web browsers 122 and 132 may be implemented such that web server 110 and web browsers 122 and 132 are unaware of the collaboration between peer proxy servers 124 and 134. For example, web browser 132 may operate without knowledge of web browser 122, while web browser 122 may operate without knowledge of web browser 132. Similarly, web server 110 may be unaware of web browser 132, and more specifically, web server 110 may be unaware that content (e.g., modified online content 125) and/or other information is passed from peer proxy server 124 to peer proxy server 134 in one embodiment. Accordingly, embodiments enable co-browsing a wide variety of content (e.g., authenticated or secure online content, streaming content, etc.). Further, embodiments reduce the interruptions caused by initiating and/or terminating the co-browsing session, thereby enabling a user of web browser 122 to seamlessly access the online content (e.g., 115) regardless of the state of the co-browsing session with web browser 132.

Figure 3:
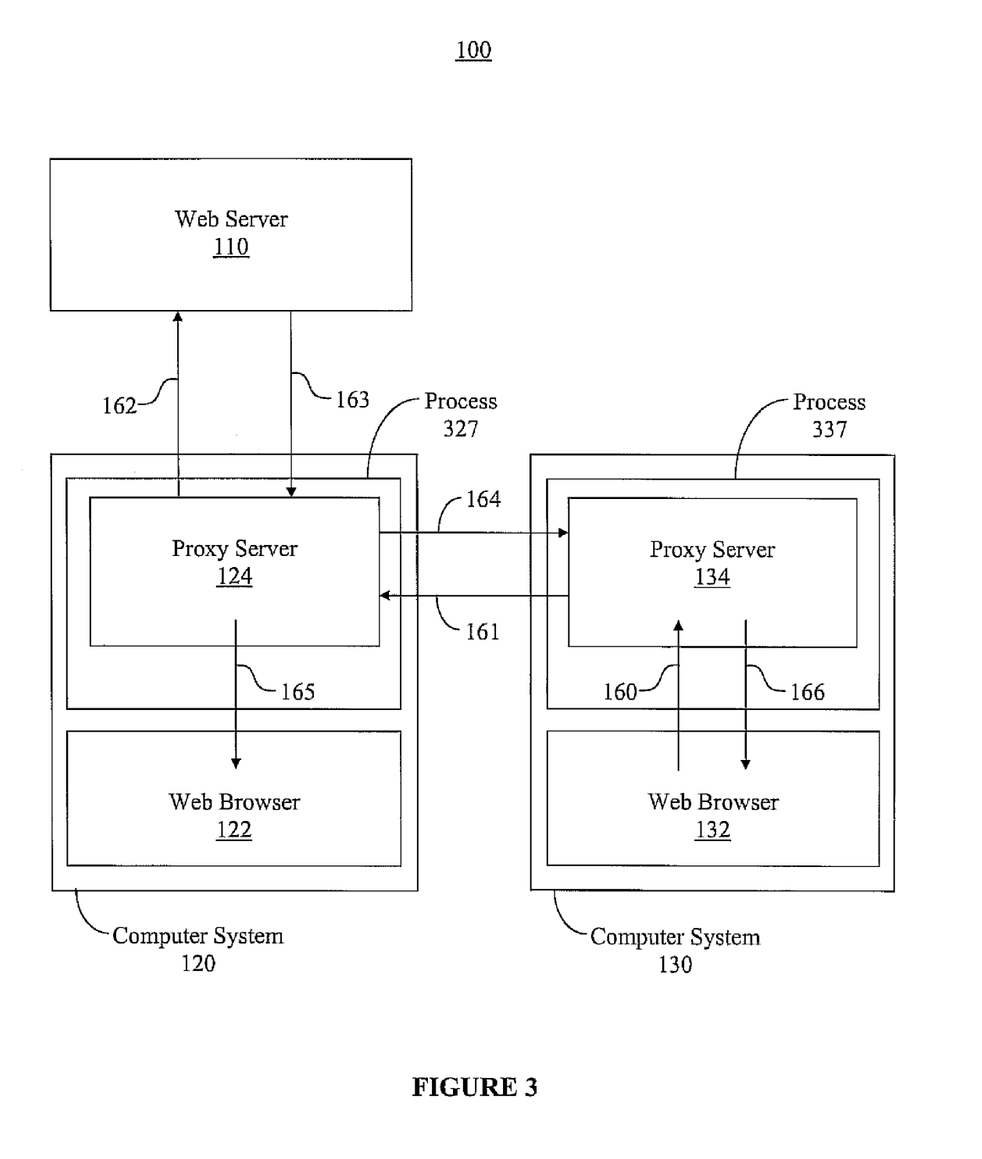
FIG. 3 shows an exemplary system for co-browsing online content with peer proxy servers running in a process separate from the web browser in accordance with one embodiment of the present invention.

Although FIGS. 1 and 2 show peer proxy servers 124 and 134 running within (e.g., as a plug-in module, etc.) a respective web browser (e.g., 122 and 132), the peer proxy servers may run outside of the respective web browsers (e.g., 122 and 132) in other embodiments. For example, FIG. 3 shows exemplary system 100 for co-browsing online content with peer proxy servers running in a process separate from the web browser in accordance with one embodiment of the present invention. As shown in FIG. 3, peer proxy server 124 may run within process 327 of computer system 120, while peer proxy server 134 may run within process 337 of computer system 130. Processes 327 and 337 may be any process separate from the respective web browser (e.g., 122 and 132) running on the respective computer system (e.g., 120 and 130). Accordingly, communications (e.g., browser event 160, browser command 165, browser command 166, etc.) may be communicated between each respective web browser (e.g., 122 and 132) and each respective peer proxy server (e.g., 124 and 134) via a respective process (e.g., 327 and 337).

Figure 4:
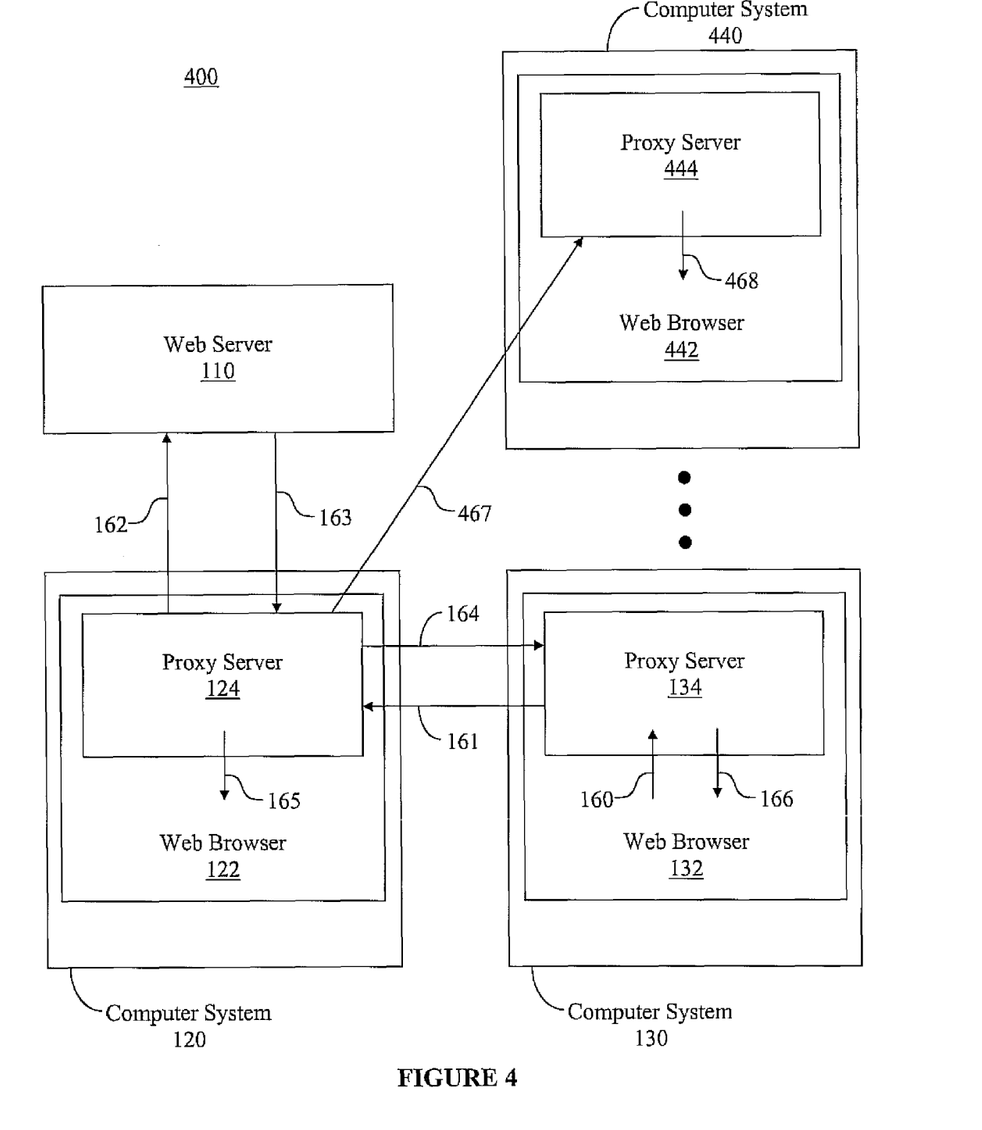
FIG. 4 shows an exemplary system for co-browsing online content with at least three computer systems coupled in a hub-and-spoke arrangement in accordance with one embodiment of the present invention.

Additionally, although FIGS. 1 and 2 show only two computer systems (e.g., 120 and 130) participating in a co-browsing session, it should be appreciated that a co-browsing session with a greater number of computer systems may be implemented in other embodiments. For example, FIG. 4 shows exemplary system 400 for co-browsing online content with at least three computer systems coupled in a hub-and-spoke arrangement in accordance with one embodiment of the present invention. As shown in FIG. 4, computer systems 120, 130 and 440 are coupled in a hub-and-spoke arrangement where each of the secondary peer proxy servers (e.g., 134, 444, etc.) communicates directly with the primary peer proxy server (e.g., 124). For example, peer proxy requests (e.g., 161, a peer proxy request generated in response to a browser event from web browser 442, etc.) are communicated directly to the primary peer proxy server (e.g., 124). Similarly, peer proxy responses (e.g., 164, 467 communicated to peer proxy server 444, etc.) generated based upon the web server response (e.g., 163) may also be communicated directly to each of the secondary peer proxy servers (e.g., 134, 444, etc.) from the primary peer proxy server (e.g., 124), thereby enabling generation of respective browser commands (e.g., 165, 166, 468, etc.) for synchronizing the online content (e.g., 115) presented on computer system 120 with the modified online content (e.g., 125) presented on the other computer systems (e.g., 130, 440, etc.) coupled in the hub-and-spoke arrangement.

Additionally, FIG. 5 shows exemplary system 500 for co-browsing online content with at least three computer systems coupled in a daisy-chain arrangement in accordance with one embodiment of the present invention. As shown in FIG. 5, computer systems 120, 130 and 550 are coupled in a daisy-chain arrangement where a secondary peer proxy server (e.g., 554) communicates with the primary peer proxy server (e.g., 124) via at least one other peer proxy server (e.g., 134). For example, peer proxy requests (e.g., 161, a peer proxy request generated in response to a browser event from web browser 552, etc.) are communicated to the primary peer proxy server (e.g., 124) via at least one other peer proxy server (e.g., 134). Similarly, peer proxy responses (e.g., 164, 567 communicated to peer proxy server 554, etc.) generated based upon the web server response (e.g., 163) may also be communicated to a secondary peer proxy servers (e.g., 554) from the primary peer proxy server (e.g., 124) via at least one other peer proxy server (e.g., 134), thereby enabling generation of respective browser commands (e.g., 165, 166, 568, etc.) for synchronizing the online content (e.g., 115) presented on computer system 120 with the modified online content (e.g., 125) presented on the other computer systems (e.g., 130, 550, etc.) coupled in the daisy-chain arrangement.

Figure 6A:
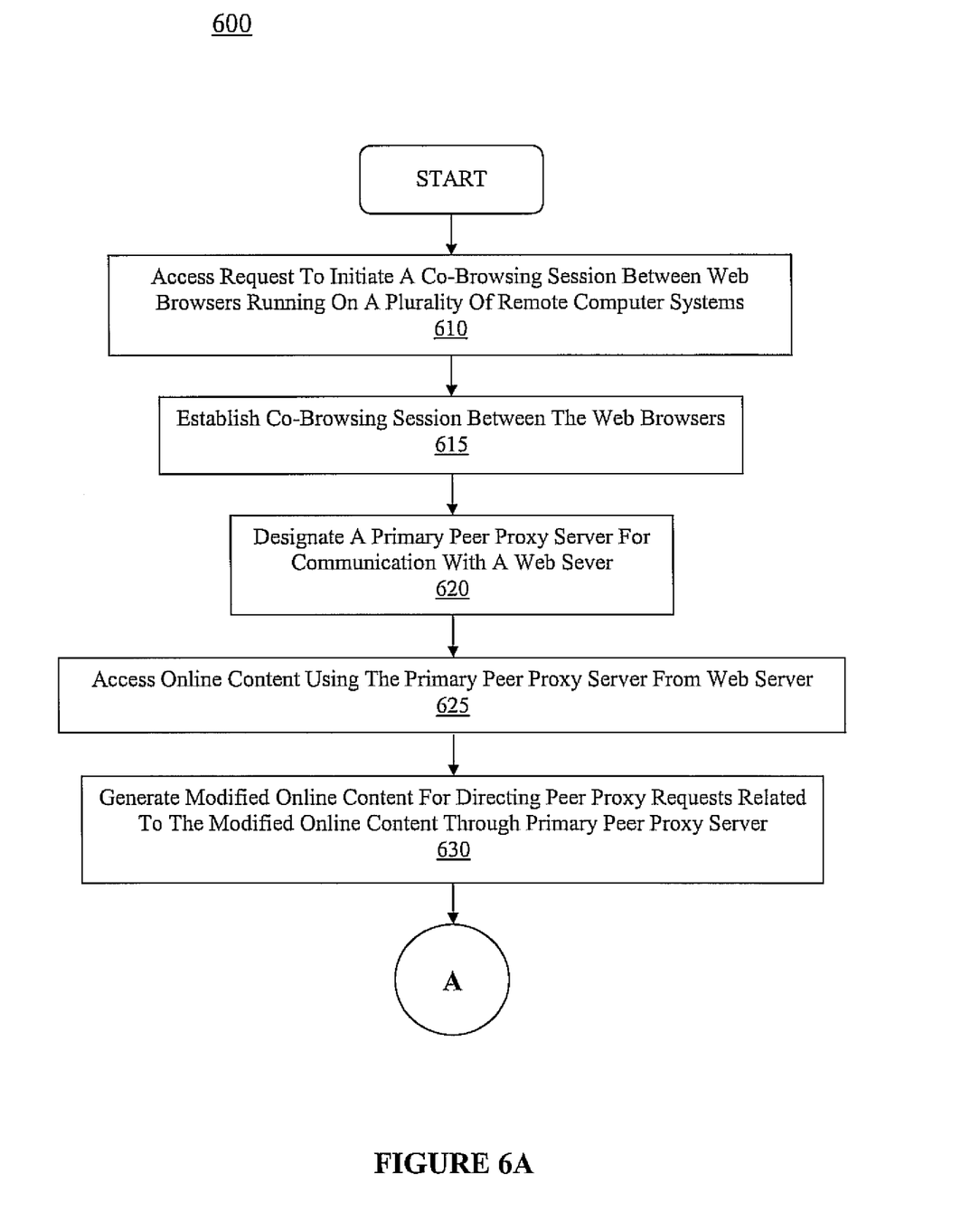
FIG. 6A shows a flowchart of a first portion of an exemplary computer-implemented process for co-browsing online content in accordance with one embodiment of the present invention.
Figure 6B:
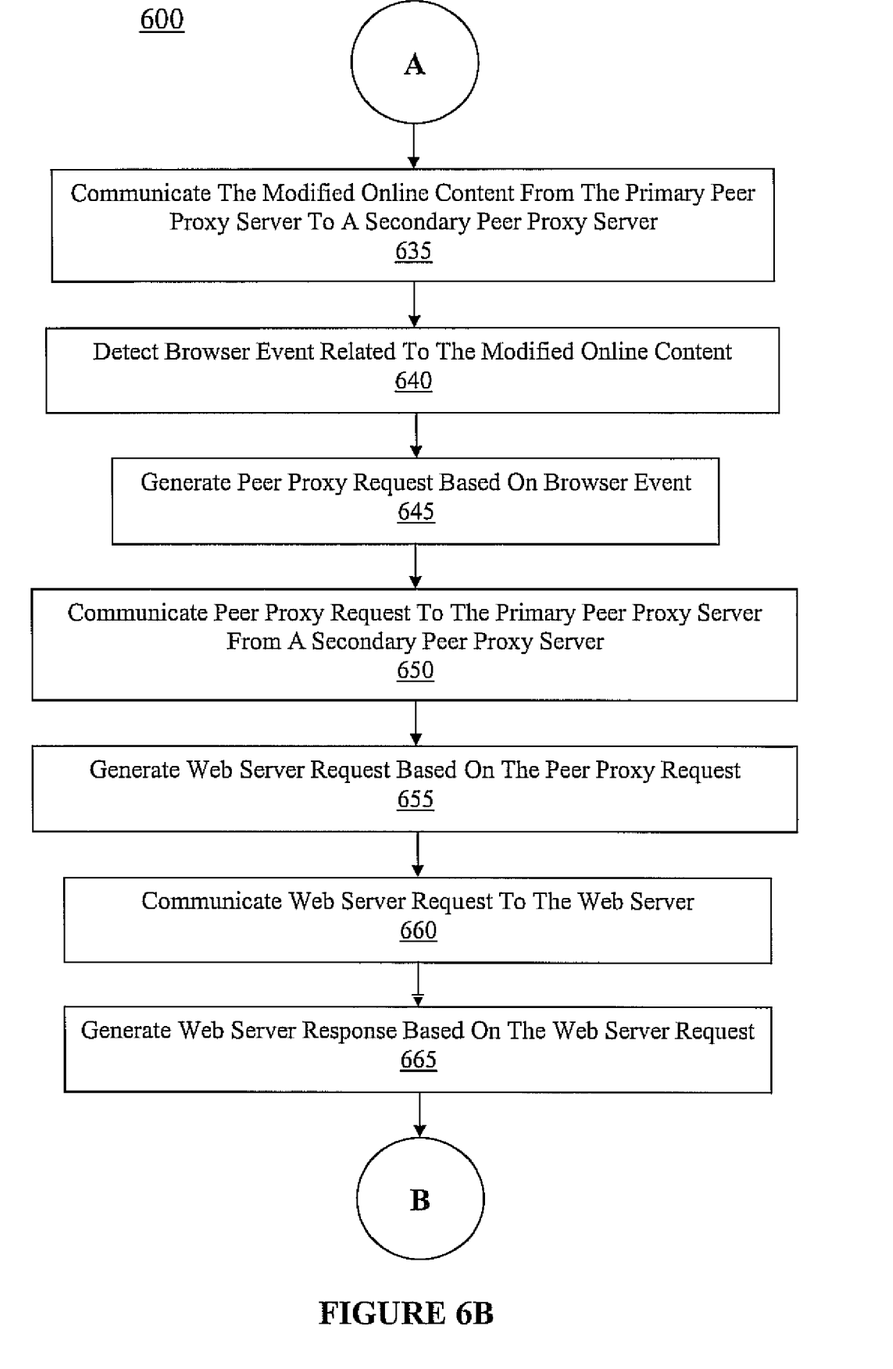
FIG. 6B shows a flowchart of a second portion of an exemplary computer-implemented process for co-browsing online content in accordance with one embodiment of the present invention.
Figure 6C:
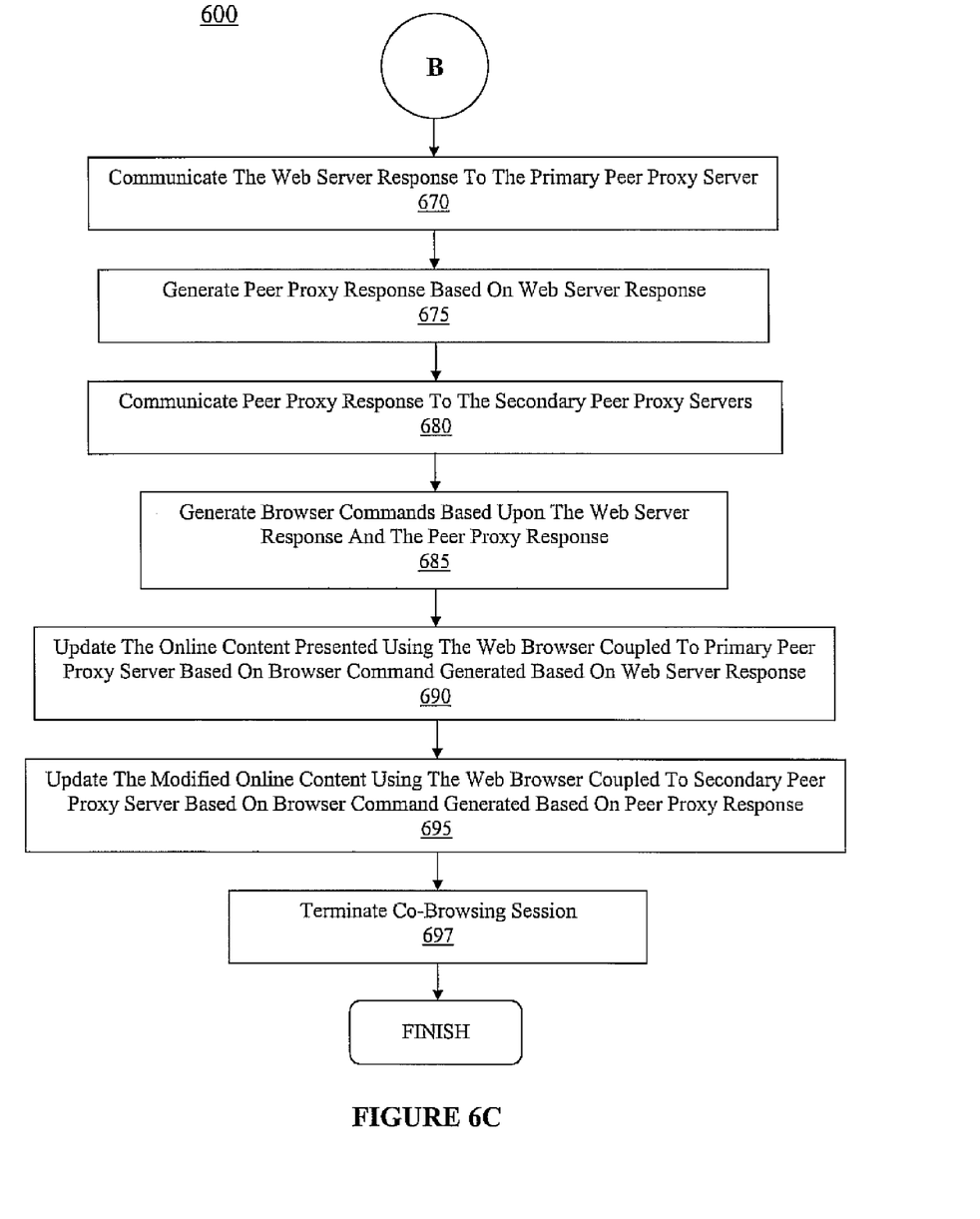
FIG. 6C shows a flowchart of a third portion of an exemplary computer-implemented process for co-browsing online content in accordance with one embodiment of the present invention.

FIGS. 6A, 6B and 6C show a flowchart of exemplary computer-implemented process 600 for co-browsing online content in accordance with one embodiment of the present invention. As shown in FIG. 6A, step 610 involves accessing a request to initiate a co-browsing session between web browsers (e.g., 122, 132, 442, 552, etc.) running on a plurality of remote computer systems (e.g., 120, 130, 440, 550, etc.). The request to initiate the co-browsing session may be generated by one of the computer systems (e.g., 120, 130, 440, 550, etc.) in response to a user-selection of one or more other computer systems (or one or more users thereof) to participate in the co-browsing session. For example, a window or drop-down menu of a graphical user interface presented on a computer system (e.g., 120, 130, 440, 550, etc.) may show one or more other users (e.g., a "buddy," group of buddies, etc.) similar to conventional instant messenger programs, thereby enabling the user of the computer system to select or identify one or more users to participate in the co-browsing session. The request generated in response to the selection of the other user may be communicated over the instant messaging network in one embodiment. Alternatively, the request may be generated via and/or accessed from a chat service, voice over internet protocol (VOIP) network, or the like.

Step 615 involves establishing the co-browsing session between the web browsers. The co-browsing session may be initiated automatically upon opening of a web browser (e.g., 122, 132, 442, 552, etc.) in one embodiment. Alternatively, the co-browsing session may be initiated automatically in response to a selection of one or more other users (e.g., in step 610) for participation in the co-browsing session in one embodiment.

Additionally, the co-browsing session may be initiated in step 615 while a user of a computer system (e.g., 120) is accessing the online content (e.g., 115). For example, a user who has trouble with the online content (e.g., filling in a form of a web page, etc.) may request the co-browsing session to receive assistance, and thus, co-browsing of the previously-accessed online content (e.g., 115) may begin in step 615 (e.g., to enable a remote user to assist the user in filling out the form). Alternatively, step 620 may be performed prior to accessing the online content (e.g., 115).

Further, one or more initialization or "handshake" procedures may be performed in step 615 by web browsers participating in the co-browsing session. Authentication procedures (e.g., exchanging of credentials such as username and password, exchange of public and/or private keys, etc.) may also be performed in step 620 during establishment of the co-browsing session between web browsers (e.g., 122, 132, 442, 552, etc.).

As shown in FIG. 6A, step 620 involves designating a primary peer proxy server (e.g., 124) for communication with a web server (e.g., 110). In one embodiment, a peer proxy server running on the computer system initiating the co-browsing session (e.g., that generates the request to initiate the co-browsing session accessed in step 610) may be designated as the primary peer proxy server. Alternatively, a plurality of rules for determining the primary peer proxy server may be accessed (e.g., from one or more of the peer proxy servers, computer systems, etc.) and used in step 620 to determine the primary peer proxy server. For example, a peer proxy server running on a computer system with the fastest or highest-bandwidth internet connection may be designated as the primary peer proxy server in one embodiment.

In one embodiment, one or more additional web browsers may join an existing co-browsing session. In this case, a request to join the existing session may be accessed as discussed with respect to step 610 herein. For example, a user requesting to join an existing co-browsing session may select the existing session (e.g., from a window, drop-down menu, etc.) and/or enter authentication and/or identification information for joining the co-browsing session (e.g., similar to joining a existing conference call), where the request may be communicated over an instant messaging network, chat service, VOIP network, or the like. Information may then be exchanged between the peer proxy server of the computer system running the new web browser and the peer proxy servers of the existing computer systems involved in the co-browsing session, thereby enabling the new web browser to join the existing co-browsing session. The new web browser may be added as a "spoke" in a hub-and-spoke arrangement (e.g., as discussed with respect to FIG. 4) in one embodiment. Alternatively, the new web browser may be added in series in a daisy-chain arrangement (e.g., as discussed with respect to FIG. 5).

Step 625 involves accessing online content using the primary peer proxy server. For example, as shown in FIG. 1, online content 115 (e.g., including code, images, video, or other content related to a web page or otherwise accessed through the Internet) may be downloaded from web sever 110 by primary peer proxy server 124.

As shown in FIG. 6A, step 630 involves generating modified online content for directing peer proxy requests related to the modified online content through the primary peer proxy server. For example, online content 115 may be accessed by primary peer proxy server 124 and used to generate modified online content 125, where online content 115 is for presentation by a first web browser (e.g., 122) and modified online content is for presentation by a second web browser (e.g., 132) running on a different computer system. The online content (e.g., 115) and the modified online content (e.g., 125) may cause the web browsers to display substantially the same information even though the underlying coding of the modified online content (e.g., 125) may be different from that of the online content (e.g., 115). For example, the modified online content (e.g., 125) may be tagged or encoded with the primary peer proxy server (e.g., 124) as the origin of the content (e.g., even though web server 110 may be the true source of online content 115), thereby directing peer proxy requests (e.g. 161 generated based upon browser event 160) from a secondary peer proxy server (e.g., 134) through the primary peer proxy server (e.g., 124).

As shown in FIG. 6B, Step 635 involves communicating the modified online content from the primary peer proxy server to a secondary peer proxy server. For example, as shown in FIG. 1, modified online content 125 is communicated from primary peer proxy server 124 to secondary peer proxy server 134.

Step 640 involves detecting a browser event (e.g., 160) related to the modified online content (e.g., 125). A peer proxy request (e.g., 161) may be generated in step 645 based on the browser event (e.g., 160). Step 650 involves communicating the peer proxy request (e.g., 161) to the primary peer proxy server (e.g., 124) from a secondary peer proxy server (e.g., 134). A web server request (e.g., 162) may be generated in step 655 based on the peer proxy request (e.g., 161) from the secondary peer proxy server (e.g., 134). The web server request (e.g., 162) may indicate that the primary peer proxy server (e.g., 124) is the origin of the browser event (e.g., 160), thereby directing the web server (e.g., 110) to communicate web server responses (e.g., 163) to the primary peer proxy server (e.g., 124).

Although steps 640 through 655 have been discussed in the context of a browser event (e.g., 160) generated from a web browser of a computer system running a second peer proxy server, it should be appreciated that the browser event may be generated by a web browser (e.g., 122) of a computer system (e.g., 120) running the primary peer proxy server (e.g., 124) in one embodiment. In this case, the browser event may be detected by the primary peer proxy server (e.g., 124) and used to generate the web server request (e.g., 124).

As shown in FIG. 6B, step 660 involves communicating the web server request to the web server. For example, web server request 162 may be communicated over a network and/or the Internet to web server 110 in one embodiment.

Step 665 involves generating a web server response (e.g., 163) based upon the web server request (e.g., 162). As shown in FIG. 6C, step 670 involves communicating the web server response (e.g., 163) to the primary peer proxy server (e.g., 124). A peer proxy response (e.g., 164) may be generated (e.g., by the primary peer proxy server) in step 675 based upon the web server response (e.g., 163). The peer proxy response (e.g., 164) may be tagged or encoded to indicate that the primary peer proxy server (e.g., 124) is the origin of the response (e.g., instead of web server 110) in one embodiment, thereby enabling the response (e.g., 164) to be communicated to the appropriate secondary peer proxy server (e.g., 134, 444, 554, etc.) and/or enabling subsequent responses from the secondary peer proxy servers (e.g., 134, 444, 554, etc.) to be directed to the primary peer proxy server (e.g., 124). Step 680 involves communicating the peer proxy response (e.g., 164) to the secondary peer proxy servers (e.g., 134, 444, 554, etc.).

As shown in FIG. 6C, step 685 involves generating browser commands based upon the web server response (e.g., communicated to the primary peer proxy server in step 670) and the peer proxy response (e.g., communicated to one or more secondary peer proxy servers in step 680). For example, a browser command (e.g., 165) may be generated by the primary peer proxy server (e.g., 124) based on the web server response (e.g., 163). Another browser command (e.g., 166) may be generated by a secondary peer proxy server (e.g., 134) based on the peer proxy response (e.g., 164).

Step 690 involves updating the online content (e.g., 115) presented using the web browser (e.g., 122) coupled to the primary peer proxy server (e.g., 124) based on the browser command (e.g., 165) generated based on the web server response (e.g., 163). Step 695 involves updating the modified online content (e.g., 125) presented using the web browser (e.g., 132) coupled to the secondary peer proxy server (e.g., 134) based on the browser command (e.g., 166) generated based on the peer proxy response (e.g., 164). In this manner, steps 690 and 695 may implement a synchronization of the content presented on each of the web browsers participating in the co-browsing session.

As shown in FIG. 6C, step 697 involves terminating the co-browsing session. In one embodiment, the user of the computer system (e.g., 120) running the primary peer proxy server (e.g., 124) may continue to browse the online content (e.g., 115) with little or no interruption as a web browser (e.g., 132) of a computer system (e.g., 130) running a secondary peer proxy server (e.g., 134) drops out of the co-browsing session, is deactivated, etc. Additionally, in one embodiment, one or more of the peer proxy servers (e.g., 124, 134, 444, 554, etc.) involved in the co-browsing session may be deactivated in step 697. Alternatively, all of the peer proxy servers (e.g., 124, 134, 444, 554, etc.) involved in the co-browsing session may be deactivated in step 697.

Figure 7:
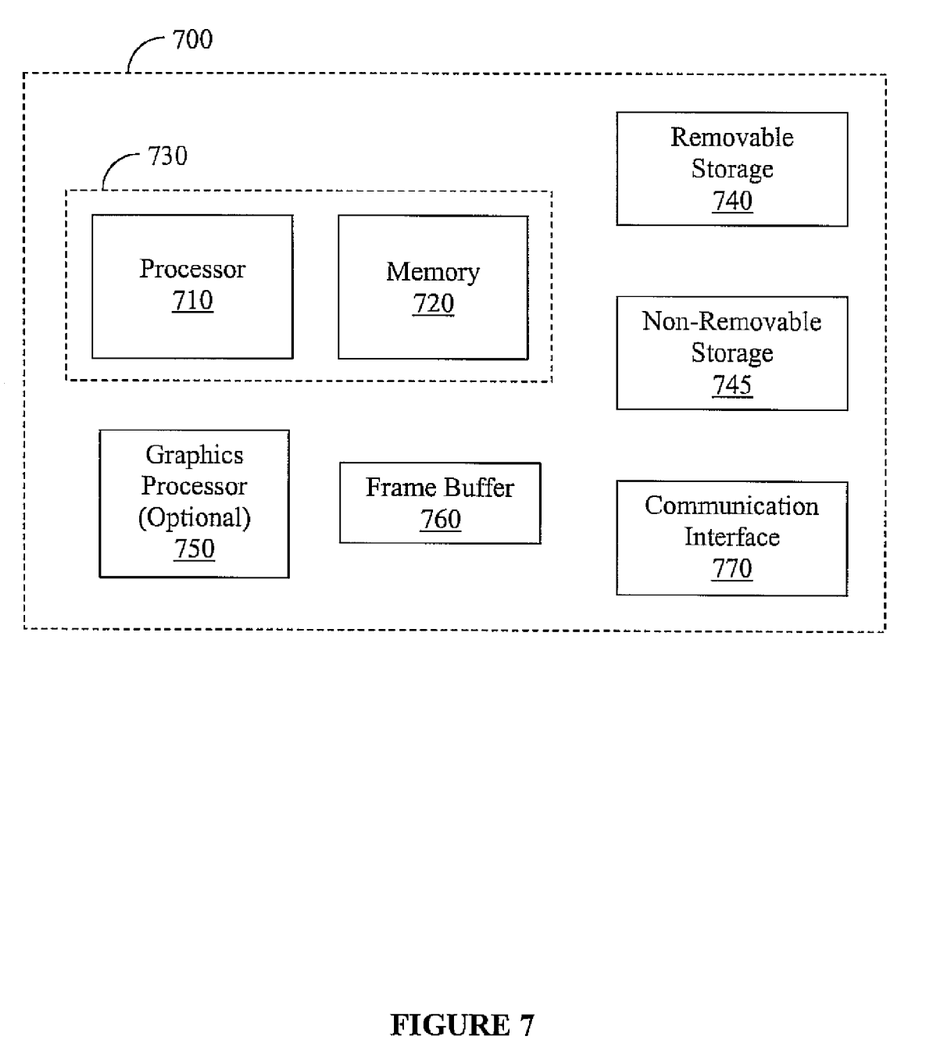
FIG. 7 shows an exemplary general purpose computer system platform upon which embodiments of the present invention may be implemented.

FIG. 7 shows exemplary general purpose computer system platform 700 upon which embodiments of the present invention may be implemented. For example, computer system 700 may be used to implement one or more components of system 100 in one embodiment. As another example, computer system 700 may be used to implement one or more components of system 400. As a further example, computer system 700 may be used to implement one or more components of system 500.

As shown in FIG. 7, portions of the present invention are comprised of computer-readable and computer-executable instructions that reside, for example, in computer system platform 700 and which may be used as a part of a general purpose computer network (not shown). It is appreciated that computer system platform 700 of FIG. 7 is merely exemplary. As such, the present invention can operate within a number of different systems including, but not limited to, general-purpose computer systems, embedded computer systems, laptop computer systems, hand-held computer systems, portable computer systems, and stand-alone computer systems, for instance.

In one embodiment, depicted by dashed lines 730, computer system platform 700 may comprise at least one processor 710 and at least one memory 720. Processor 710 may comprise a central processing unit (CPU) or other type of processor. Depending on the configuration and/or type of computer system environment, memory 720 may comprise volatile memory (e.g., RAM), non-volatile memory (e.g., ROM, flash memory, etc.), or some combination of the two. Additionally, memory 720 may be removable, non-removable, etc.

In other embodiments, computer system platform 700 may comprise additional storage (e.g., removable storage 740, non-removable storage 745, etc.). Removable storage 740 and/or non-removable storage 745 may comprise volatile memory, non-volatile memory, or any combination thereof. Additionally, removable storage 740 and/or non-removable storage 745 may comprise CD-ROM, digital versatile disks (DVD) or other optical storage, magnetic cassettes, magnetic tape, magnetic disk storage or other magnetic storage devices, or any other medium which can be used to store information for access by computer system platform 700.

As shown in FIG. 7, computer system platform 700 may communicate with other systems, components, or devices via communication interface 770. Communication interface 770 may embody computer readable instructions, data structures, program modules or other data in a modulated data signal (e.g., a carrier wave) or other transport mechanism. By way of example, and not limitation, communication interface 770 may couple to wired media (e.g., a wired network, direct-wired connection, etc.) and/or wireless media (e.g., a wireless network, a wireless connection utilizing acoustic, RF, infrared, or other wireless signaling, etc.).

Communication interface 770 may also couple computer system platform 700 to one or more input devices (e.g., a keyboard, mouse, pen, voice input device, touch input device, etc.). Additionally, communication interface 770 may couple computer system platform 700 to one or more output devices (e.g., a display, speaker, printer, etc.).

As shown in FIG. 7, optional graphics processor 750 may perform graphics processing operations on graphical data stored in frame buffer 760 or another memory (e.g., 720, 740, 745, etc.) of computer system platform 700. Graphical data stored in frame buffer 760 may be accessed, processed, and/or modified by components (e.g., graphics processor 750, processor 710, etc.) of computer system platform 700 and/or components of other systems/devices. Additionally, the graphical data may be accessed (e.g., by graphics processor 750) and displayed on an output device coupled to computer system platform 700. Accordingly, memory 720, removable storage 740, non-removable storage 745, fame buffer 760, or a combination thereof, may comprise instructions that when executed on a processor (e.g., 710, 750, etc.) implement a process for co-browsing online content (e.g., as discussed herein).

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of co-browsing online content, said method comprising:
    activating a first peer proxy server on a first computer system and a second peer proxy server on a second computer system, wherein said first computer system is disposed remotely from said second computer system, wherein said first computer system is operable to present online content using a first web browser running on said first computer system;
    generating modified online content for presentation by a second web browser running on said second computer system, wherein said modified online content is further operable to route browser events associated with said second web browser through said first peer proxy server;
    communicating a browser event from said second peer proxy server to a web server via said first peer proxy server; and
    synchronizing said first and second web browsers based on a web server response from said web server generated in response to said browser event, wherein said synchronizing further comprises updating said online content and said modified online content based upon said web server response.

2. The method of claim 1, wherein collaboration between said first and second peer proxy servers is transparent to said web server, said first web browser and said second web browser.

3. The method of claim 1, wherein said first peer proxy server is operable within said first web browser, and wherein said second peer proxy server is operable within said second web browser.

4. The method of claim 1, wherein said first peer proxy server is operable within a first process separate from said first web browser, and wherein said second peer proxy server is operable within a second process separate from said second web browser.

5. The method of claim 1, wherein said activating said first and second peer proxy servers is in response to an activation of said first web browser.

6. The method of claim 1 further comprising:
    responsive to an activation of said first peer proxy server, establishing a co-browsing session between said first and second computer systems.

7. The method of claim 6, wherein said user-initiated operation comprises a user selection of a user associated with said second web browser for joining a co-browsing session.

8. The method of claim 1, wherein said generating said modified online content further comprises generating said modified online content with restricted access to a portion of said online content associated with a user-initiated access restriction.

9. The method of claim 1 further comprising:
    activating a third peer proxy server on a third computer system;
    communicating said modified online to said third peer proxy server for presentation using a third web browser during presentation of said online content by said first web browser; and
    communicating said peer proxy response to said third peer proxy server for synchronizing said modified online content with said online content based upon said web server response.

10. The method of claim 1 further comprising:
    activating a third peer proxy server on a third computer system;
    communicating said modified online to said third peer proxy server via said second peer proxy server for presentation using a third web browser during presentation of said online content by said first web browser; and
    communicating said peer proxy response to said third peer proxy server via said second peer proxy server for synchronizing said modified online content with said online content based upon said web server response.

11. A non-transitory computer-readable storage medium having computer-readable program code embodied therein for causing a computer system to perform a method of co-browsing online content, said method comprising:
    activating a first peer proxy server on a first computer system and a second peer proxy server on a second computer system, wherein said first computer system is disposed remotely from said second computer system, wherein said first computer system is operable to present online content using a first web browser running on said first computer system;
    generating modified online content for presentation by a second web browser running on said second computer system, wherein said modified online content is further operable to route browser events associated with said second web browser through said first peer proxy server;

communicating a browser event from said second peer proxy server to a web server via said first peer proxy server; and synchronizing said first and second web browsers based on a web server response from said web server generated in response to said browser event, wherein said synchronizing further comprises updating said online content and said modified online content based upon said web server response.

12. The computer-readable storage medium of claim 11, wherein collaboration between said first and second peer proxy servers is transparent to said web server, said first web browser and said second web browser.

13. The computer-readable storage medium of claim 11, wherein said first peer proxy server is operable within said first web browser, and wherein said second peer proxy server is operable within said second web browser.

14. The computer-readable storage medium of claim 11, wherein said first peer proxy server is operable within a first process separate from said first web browser, and wherein said second peer proxy server is operable within a second process separate from said second web browser.

15. The computer-readable storage medium of claim 11, wherein said activating said first and second peer proxy servers is in response to an activation of said first web browser.

16. The computer-readable storage medium of claim 11, wherein said method further comprises:
responsive to an activation of said first peer proxy server, establishing a co-browsing session between said first and second computer systems.

17. The computer-readable storage medium of claim 16, wherein said user-initiated operation comprises a user selection of a user associated with said second web browser for joining a co-browsing session.

18. The computer-readable storage medium of claim 11, wherein said generating said modified online content further comprises generating said modified online content with restricted access to a portion of said online content associated with a user-initiated access restriction.

19. The computer-readable storage medium of claim 11, wherein said method further comprises:
activating a third peer proxy server on a third computer system;
communicating said modified online to said third peer proxy server for presentation using a third web browser during presentation of said online content by said first web browser; and
communicating said peer proxy response to said third peer proxy server for synchronizing said modified online content with said online content based upon said web server response.

20. The computer-readable storage medium of claim 11, wherein said method further comprises:
activating a third peer proxy server on a third computer system;
communicating said modified online to said third peer proxy server via said second peer proxy server for presentation using a third web browser during presentation of said online content by said first web browser; and
communicating said peer proxy response to said third peer proxy server via said second peer proxy server for synchronizing said modified online content with said online content based upon said web server response.

21. A system comprising a processor and a memory, wherein said memory comprises instructions that when executed by said system implement a method of co-browsing online content, said method comprising:

activating a first peer proxy server on a first computer system and a second peer proxy server on a second computer system, wherein said first computer system is disposed remotely from said second computer system, wherein said first computer system is operable to present online content using a first web browser running on said first computer system;

generating modified online content for presentation by a second web browser running on said second computer system, wherein said modified online content is further operable to route browser events associated with said second web browser through said first peer proxy server;

communicating a browser event from said second peer proxy server to a web server via said first peer proxy server; and synchronizing said first and second web browsers based on a web server response from said web server generated in response to said browser event, wherein said synchronizing further comprises updating said online content and said modified online content based upon said web server response.

22. The system of claim 21, wherein collaboration between said first and second peer proxy servers is transparent to said web server, said first web browser and said second web browser.

23. The system of claim 21, wherein said first peer proxy server is operable within said first web browser, and wherein said second peer proxy server is operable within said second web browser.

24. The system of claim 21, wherein said first peer proxy server is operable within a first process separate from said first web browser, and wherein said second peer proxy server is operable within a second process separate from said second web browser.

25. The system of claim 21, wherein said activating said first and second peer proxy servers is in response to an activation of said first web browser.

26. The system of claim 21, wherein said method further comprises:
responsive to an activation of said first peer proxy server, establishing a co-browsing session between said first and second computer systems.

27. The system of claim 26, wherein said user-initiated operation comprises a user selection of a user associated with said second web browser for joining a co-browsing session.

28. The system of claim 21, wherein said generating said modified online content further comprises generating said modified online content with restricted access to a portion of said online content associated with a user-initiated access restriction.

29. The system of claim 21, wherein said method further comprises:
activating a third peer proxy server on a third computer system;
communicating said modified online to said third peer proxy server for presentation using a third web browser during presentation of said online content by said first web browser; and
communicating said peer proxy response to said third peer proxy server for synchronizing said modified online content with said online content based upon said web server response.

30. The system of claim 21, wherein said method further comprises:
activating a third peer proxy server on a third computer system;

communicating said modified online to said third peer proxy server via said second peer proxy server for presentation using a third web browser during presentation of said online content by said first web browser; and communicating said peer proxy response to said third peer proxy server via said second peer proxy server for synchronizing said modified online content with said online content based upon said web server response.

* * * * *